(12) United States Patent
Bessac et al.

(10) Patent No.: US 11,305,460 B2
(45) Date of Patent: Apr. 19, 2022

(54) TORPEDO FOR EXTRUDER

(71) Applicant: COMPAGNIE GENERALE DES ETABLISSEMENTS MICHELIN, Clermont-Ferrand (FR)

(72) Inventors: Christophe Bessac, Clermont-Ferrand (FR); Mickael Rouby, Clermont-Ferrand (FR); Gilles Bonhomme, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 279 days.

(21) Appl. No.: 16/472,291

(22) PCT Filed: Dec. 19, 2017

(86) PCT No.: PCT/EP2017/083446
§ 371 (c)(1),
(2) Date: Jun. 21, 2019

(87) PCT Pub. No.: WO2018/114888
PCT Pub. Date: Jun. 28, 2018

(65) Prior Publication Data
US 2019/0375133 A1    Dec. 12, 2019

(30) Foreign Application Priority Data
Dec. 21, 2016 (FR) .................. 1663007

(51) Int. Cl.
*B29B 7/40* (2006.01)
*B29C 48/25* (2019.01)
(Continued)

(52) U.S. Cl.
CPC ............ *B29B 7/408* (2013.01); *B29B 7/421* (2013.01); *B29C 48/25682* (2019.02);
(Continued)

(58) Field of Classification Search
CPC ............ B29C 48/565; B29C 48/25682; B29C 48/266; B29B 7/421
See application file for complete search history.

(56) References Cited

U.S. PATENT DOCUMENTS 3,486,194 A    12/1969  Parks
4,723,847 A    2/1988   Dray
(Continued)

FOREIGN PATENT DOCUMENTS

CN    202 878 656 U    4/2013
WO    92/20508 A1      11/1992

OTHER PUBLICATIONS

International Search report dated Apr. 4, 2018, in corresponding PCT/EP2017/083446 (6 pages).

*Primary Examiner* — Niki Bakhtiari
*Assistant Examiner* — John J DeRusso
(74) *Attorney, Agent, or Firm* — Venable LLP

(57) ABSTRACT

A torpedo for an extruder comprises: longitudinal member (9) which is provided at the periphery thereof with a plurality of thread portions (12) which protrude outwards and which are spaced apart in the circumferential direction; a plurality of sluice blades (19) which are mounted so as to be movable on the longitudinal member and which are partially engaged in apertures (18) of the longitudinal member, the longitudinal member (9) and the sluice blades (19) being provided with complementary radial guiding surfaces (13, 14, 18) which are in contact with each other; and adjustment means (28) for radially displacing the sluice blades relative to the longitudinal member. The sluice blades extend through the spaces between the thread portions, respectively. The thread portions (12) and the sluice blades (19) are provided with complementary radial guiding surfaces (13, 14, 18).

9 Claims, 8 Drawing Sheets

(51) Int. Cl.
    *B29B 7/42*     (2006.01)
    *B29C 48/565*   (2019.01)
    *B29C 48/505*   (2019.01)
    *B29C 48/67*    (2019.01)

(52) U.S. Cl.
    CPC .......... *B29C 48/266* (2019.02); *B29C 48/507* (2019.02); *B29C 48/565* (2019.02); *B29C 48/67* (2019.02); *B29C 2948/92885* (2019.02)

(56) References Cited

U.S. PATENT DOCUMENTS

| | | |
|---|---|---|
| 5,071,255 A | 12/1991 | Dray et al. |
| 5,258,158 A | 11/1993 | Dray |
| 2016/0151953 A1* | 6/2016 | Letocart .................. B29C 48/51 425/202 |

* cited by examiner

TORPEDO FOR EXTRUDER

BACKGROUND

The present invention relates to the field of extruders, in particular for producing profiled elements via dies.

Generally, an extruder, for the extrusion of a plastics or rubber material, comprises a longitudinal sheath in which there is arranged a longitudinal screw which can be driven in rotation in order to move the material to be extruded in a downstream direction in the direction of an extrusion die whose channel determines the cross-section of the profiled element to be obtained.

In particular, in the field of extrusion of a rubber mixture in the form of a profiled element which can subsequently be used for the production of tyres, the extrusion screw is provided, at the downstream end thereof located at the side of the die, with a head, generally referred to as a torpedo, which has at the periphery thereof threads which advance the material and which bring about a mixing or stirring, referred to as working, of the rubber mixture.

Currently, there corresponds to each rubber mixture which is intended to be extruded a specific torpedo whose configuration is adapted to this mixture in order to obtain the desired working of the mixture. When it is desirable to extrude different rubber mixtures using the same extruder, it is necessary to deposit the torpedo in place in the extruder and to mount in its place the torpedo which is suitable for the new mixture to be extruded. Consequently, it is necessary to have produced and arranged as many different torpedoes as different mixtures which it is desirable to extrude and it is necessary to provide for production downtimes which are required for the disassembly and reassembly of the torpedoes.

Patents U.S. Pat. Nos. 4,723,847 and 5,071,255 describe extruders in which the screw is provided with a plate which protrudes locally relative to the base of the threads so that the entire protruding portion of the plate is completely embedded in the material to be extruded. In fact, such a plate produces very little mixing effect of the material to be extruded.

An object of the present invention is to prevent the above disadvantages.

SUMMARY

According to an embodiment, there is proposed a torpedo for an extruder which comprises a longitudinal member which is provided at the periphery thereof with a plurality of thread portions which protrude outwards and which are spaced apart in the circumferential direction, a plurality of sluice blades which are mounted so as to be movable on the longitudinal member and which are partially engaged in apertures (18) of the longitudinal member, the longitudinal member and the sluice blades being provided with complementary radial guiding surfaces which are in contact with each other, and adjustment means for radially displacing the sluice blades relative to the longitudinal member.

According to the invention, on the one hand, the sluice blades extend over the spaces between the thread portions and, on the other hand, the thread portions and the sluice blades are provided with complementary radial guiding surfaces which are in contact with each other in a sealing manner.

In this manner, the sluice blades create obstacles which protrude relative to the longitudinal member and which extend over the spaces between the thread portions so that the material to be extruded is obliged to pass the sluice blades by passing only above the edges of the sluice blades, remote from the longitudinal member.

The thread portions may comprise protruding portions between which the sluice blades extend.

The adjustment means may comprise a longitudinal shaft which is rotatably mounted in a longitudinal channel of the longitudinal member, this longitudinal shaft and the sluice blades having complementary surfaces which cooperate in order to radially displace the sluice blades when the longitudinal shaft is displaced.

The longitudinal shaft may comprise at least one radial plate, one radial face of which is provided with at least one helical groove, the sluice blades comprising a finger which is engaged in this groove.

The longitudinal member may be provided with an end piece for blocking the longitudinal channel.

The end piece may have a longitudinal access channel with respect to an end of the longitudinal shaft, the end piece being provided with a stopper for blocking this longitudinal access channel.

The sluice blades may be mounted on the longitudinal member in a sealing manner.

Sealing means may be provided between the sluice blades and the longitudinal member.

The sluice blades may comprise deformable portions which are pressed in a sealing manner against surfaces of the longitudinal member.

The sluice blades may extend longitudinally and the thread portions extend in a helical manner.

There is also proposed an extruder which comprises a sheath which has a longitudinal channel and which comprises a rotating longitudinal assembly which comprises a screw and the torpedo, which is mounted at a downstream end of the screw, the thread portions of the torpedo having outer edges which are adjacent to the wall of the longitudinal channel of the sheath and reduced flow spaces being provided between outer edges of the sluice blades and the wall of the longitudinal channel of the sheath.

BRIEF DESCRIPTION OF THE FIGURES

A torpedo and an extruder which is provided with such a torpedo will now be described by way of non-limiting example, wherein they are illustrated by the appended drawings, in which.

DETAILED DESCRIPTION

Figure 1:
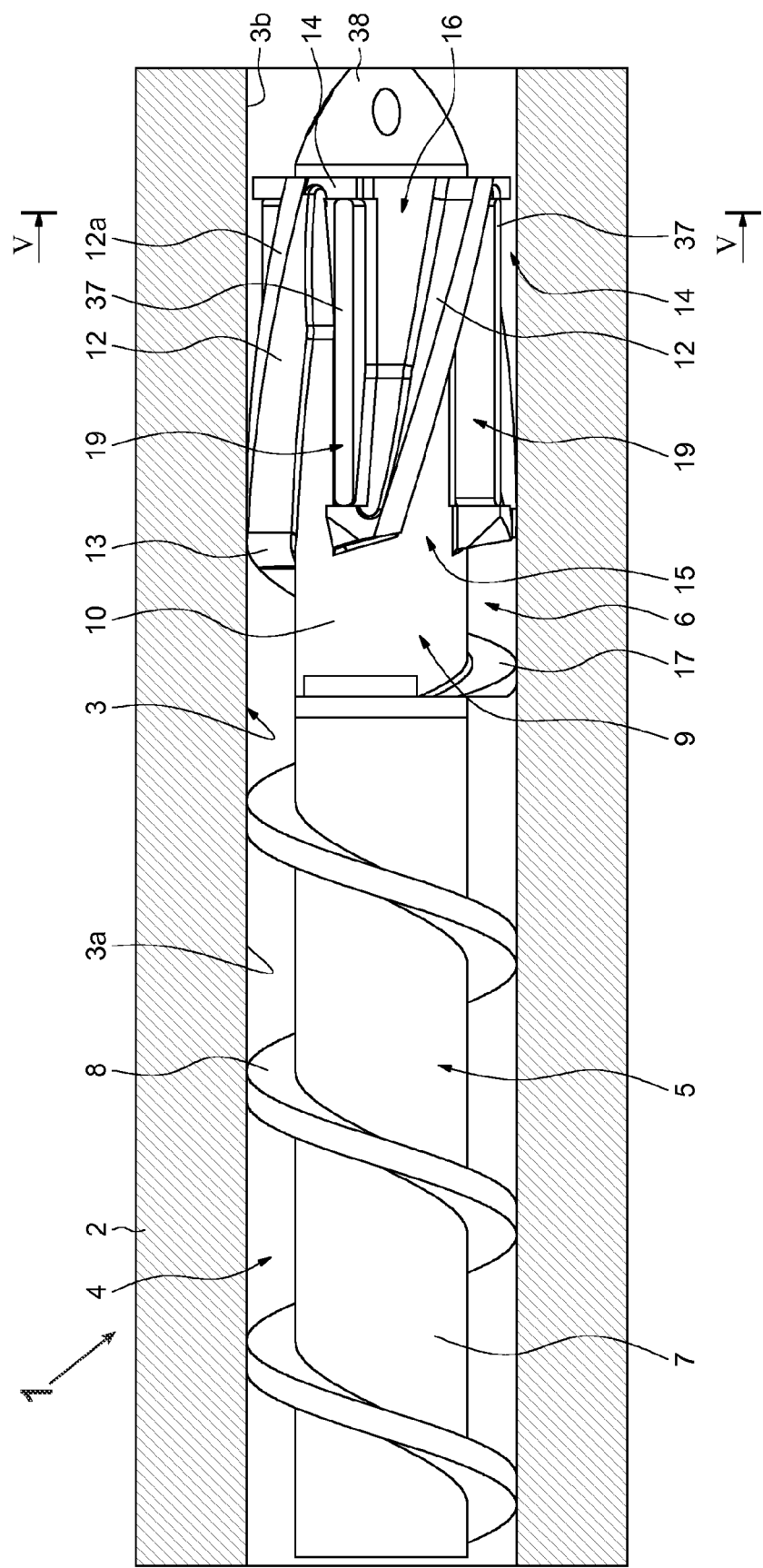
FIG. 1 is a partial longitudinal section of an extruder, provided with a torpedo.

FIG. 1 partially illustrates an extruder 1 which comprises a longitudinal sheath 2 which has a channel 3 which has a longitudinal axis which is, for example, cylindrical, and which extends in a downstream direction. A rotating longitudinal assembly 4 is installed in this longitudinal channel 3 for driving a material to be extruded in a downstream direction.

The extruder 1 comprises a geared motor (not illustrated) for driving the rotating longitudinal assembly 4, placed upstream, an extrusion die (not illustrated) placed downstream of the torpedo 6 and means (not illustrated) for introducing the material to be extruded into the longitudinal channel 3.

The rotating longitudinal assembly 4 comprises an upstream longitudinal screw 5 and a downstream longitudinal torpedo 6 whose upstream end is mounted on the downstream end of the screw 5 via fixing means (not illustrated). The screw 5 extends over an upstream portion 3a of the longitudinal channel 3 and the torpedo 6 extends over a downstream portion 3b of the longitudinal channel 3.

The screw 5 comprises a longitudinal member 7 which is, for example, cylindrical, and which is remote from the wall of the longitudinal channel 3 and provided with a helical outer thread 8. The periphery of the outer thread 8 of the longitudinal screw 5 is adjacent to the wall of the longitudinal channel 3, in sliding contact or with a small radial play between the periphery of the outer thread 8 and the wall of the longitudinal channel 3.

Figure 2:
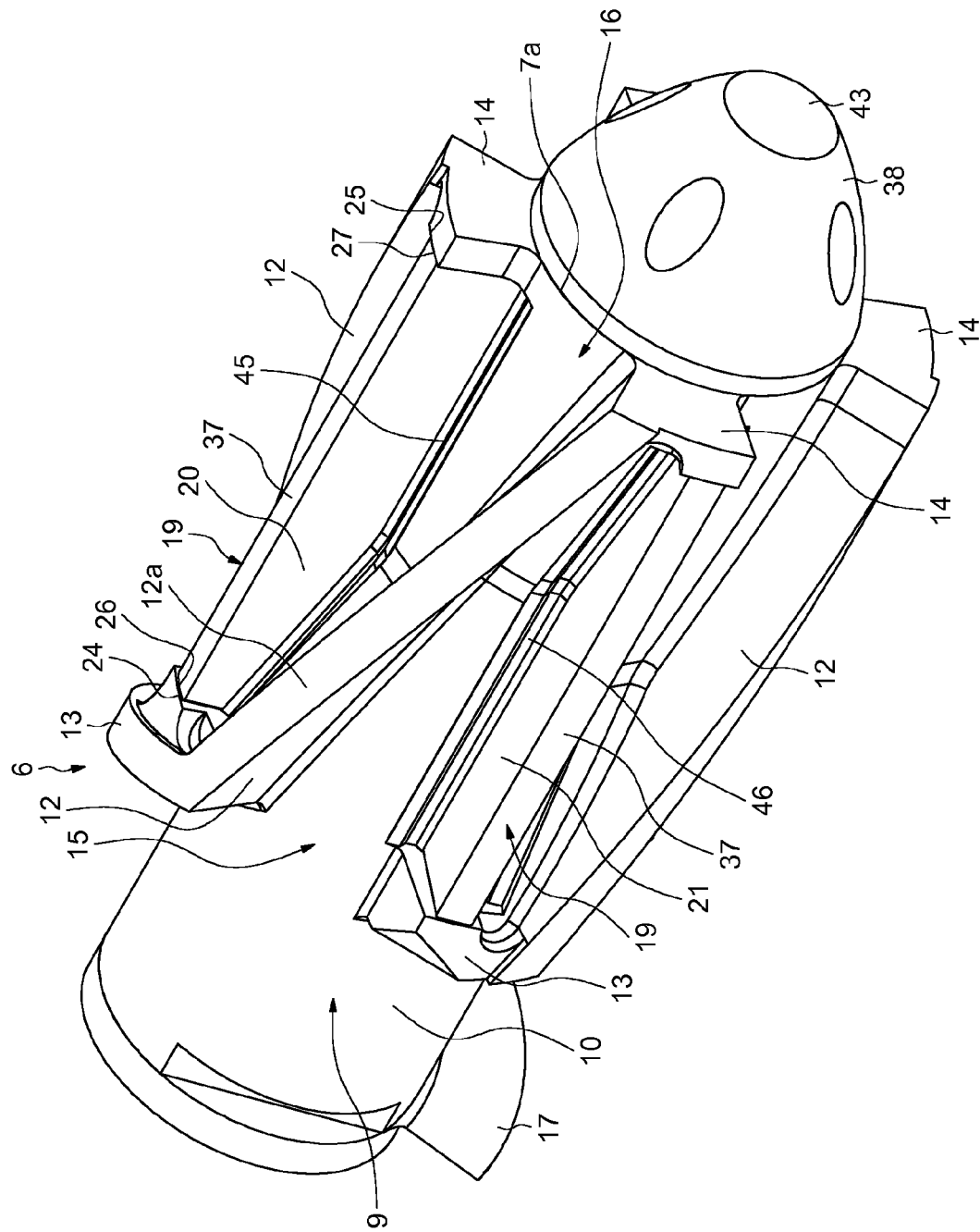
FIG. 2 is a perspective outer view of the torpedo of FIG. 1.
Figure 3:
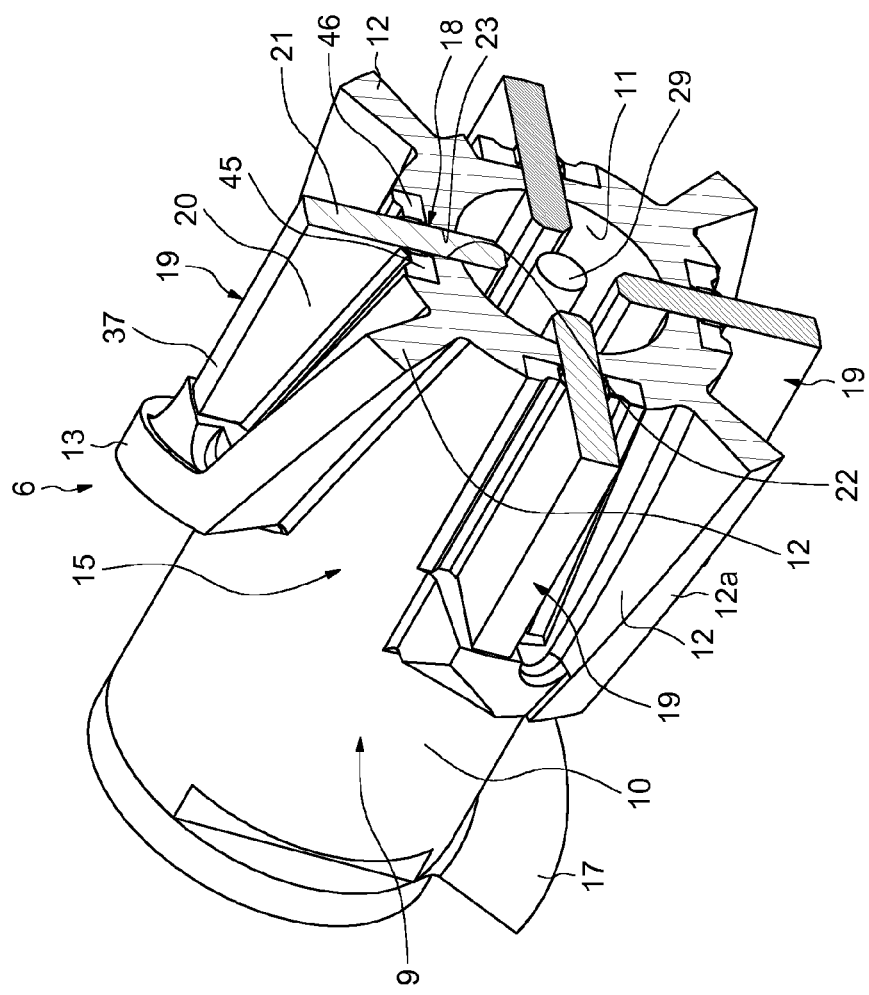
FIG. 3 is a perspective partial radial section of the torpedo of FIG. 2.
Figure 4:
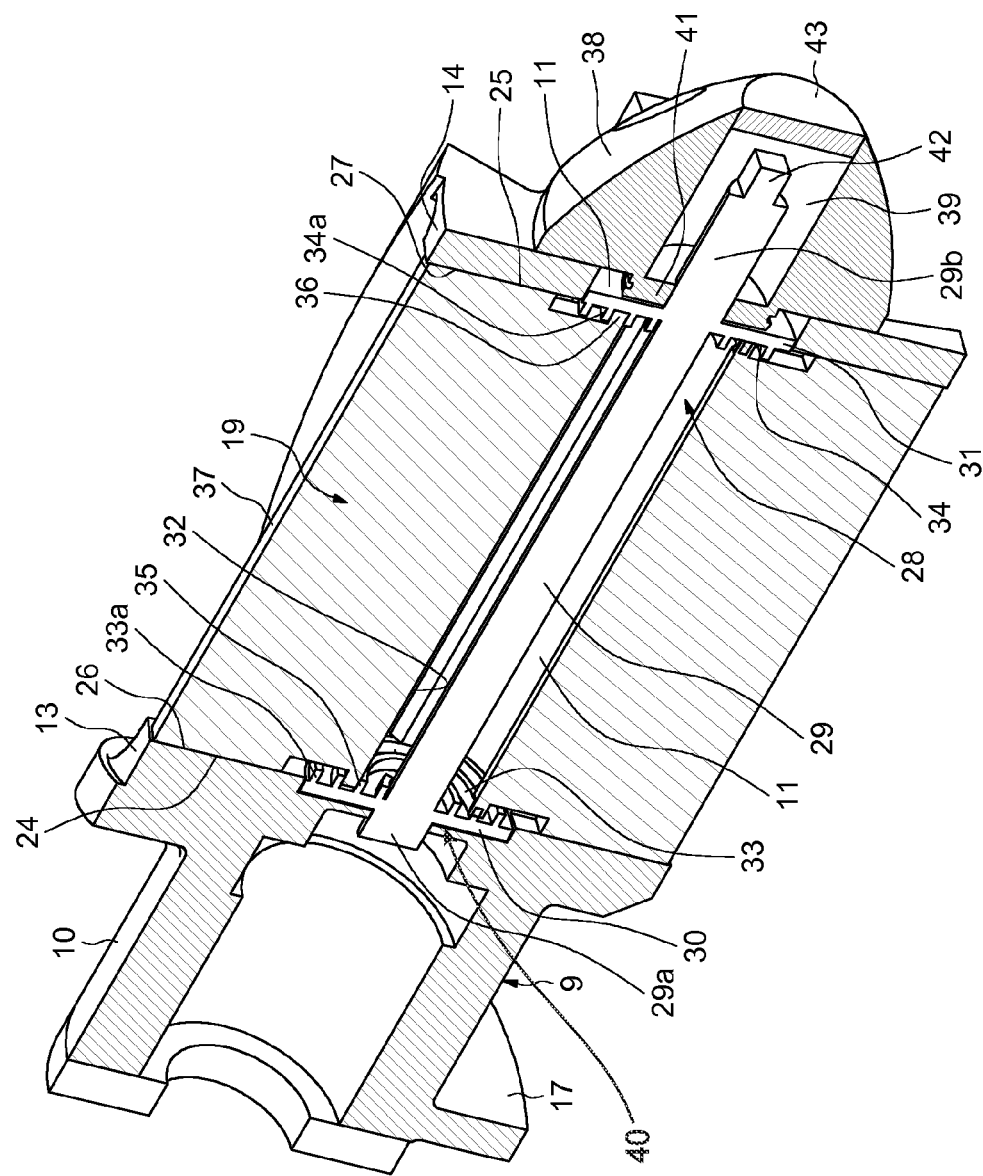
FIG. 4 is a perspective longitudinal section of the torpedo of FIG. 2.

As illustrated in FIGS. 2 to 4, a torpedo 6 comprises a longitudinal member 9 which is remote from the wall of the longitudinal channel 3 and the peripheral surface 10 of which is in the extension of the peripheral surface of the body 7 of the screw 5 and which has an inner longitudinal passage 11 which is, for example, cylindrical.

The longitudinal member 9 of the torpedo 6 is provided with thread portions 12 which protrude outwards and which are spaced apart in the peripheral direction, providing between them spaces for the material to be extruded to flow. For example, as illustrated, the thread portions 12 extend in a helical manner in order to drive and guide the material to be extruded, over a downstream portion of the longitudinal member 9, and are equally spaced apart from each other and total four in number.

The helix angle of the thread portions 12 is less than the helix angle of the thread 8 of the screw 5.

The longitudinal member 9 of the torpedo 6 is further provided with upstream outer local portions 13 and downstream outer local portions 14 which protrude outwards.

The upstream and downstream local portions 13 and 14 extend in the peripheral direction and in the reverse direction, respectively, the upstream and downstream ends of the thread portions 12, without reaching the portions of adjacent threads.

The upstream local portion 13 attached to each thread portion 12 is, longitudinally, spaced apart and faces the downstream local portion 14 which is attached to the adjacent thread portion 12.

In this manner, longitudinal upstream spaces remain between the upstream portion of each thread portion 12 and the upstream local portion 13 attached to the adjacent thread portion 12, respectively, and downstream longitudinal spaces 16 remain between the downstream portion of each thread portion 12 and the downstream local portion 14 attached to the adjacent thread portion 12, respectively, the upstream and downstream longitudinal spaces 15 and 16 communicate with the corresponding spaces which separate the thread portions 12.

The periphery of the thread portions 12 and upstream and downstream local portions 13 and 14 is adjacent to the wall of the downstream portion 3a of the longitudinal channel 3, in sliding contact or with slight radial play between them.

The longitudinal member 9 of the torpedo 6 is provided on the upstream portion thereof with a protruding intermediate thread portion 17 which extends in an upstream direction one of the upstream local portions 13 and which, for example, joins the downstream end of the thread 8 of the screw 5.

The intermediate thread portion 17 has the same helix angle as the thread 8. The periphery of the intermediate thread portion 17 is adjacent to the wall of the downstream portion 3a of the longitudinal channel 3, in sliding contact or with slight radial play between them.

The longitudinal member 9 of the torpedo 6 has longitudinal apertures 18, which are optionally completely through-holes and which open radially at the outer side at the side of the peripheral surface 10 and at the inner side at the side of the inner longitudinal passage 11 and which extend in the zones located between the thread portions 12 and between the upstream local portions 13 and downstream local portions 14, respectively.

The torpedo 6 comprises longitudinal sluice blades 19 which extend through the spaces between the thread portions 12, respectively.

The longitudinal sluice blades 19 are partially engaged in the longitudinal apertures 18 from the outer side to the inner side.

The longitudinal sluice blades 19 have an inner portion which is engaged in the longitudinal apertures 18 of the longitudinal member 9 and an outer portion which extends inwards, respectively, protruding relative to the peripheral surface 10 of the longitudinal member 9, and which extend through the spaces between the thread portions 12. According to the example described, the outer portions of the longitudinal sluice blades 19 extend between the upstream and downstream local portions 13 and 14.

The longitudinal sluice blades 19 can be moved radially relative to the longitudinal member 9, the longitudinal member 9 and the longitudinal sluice blades 19 being provided with complementary radial guiding surfaces which are in contact with each other. The sluice blades 19 extend through the spaces between the thread portions 12, respectively. The thread portions 12 and the sluice blades 19 are provided with complementary surfaces for radial guiding which are in contact with each other. The complementary radial guiding surfaces are capable of sliding on each other in a sealing manner.

According to a specific arrangement, on the one hand, the longitudinal sluice blades 19 have opposing parallel longitudinal faces 20 and 21 which are capable of sliding against opposing parallel longitudinal faces 22 and 23 which longitudinally delimit the longitudinal apertures 18 and, on the other hand, the longitudinal sluice blades 19 have opposing radial end faces 24 and 25 which are capable of sliding against opposing radial faces 26 and 27 of the corresponding upstream and downstream local portions 13 and 14.

The torpedo 6 comprises means 28 for adjusting the radial position of the longitudinal sluice blades 19 relative to the longitudinal member 9.

The adjustment means 28 comprise a longitudinal rotating adjustment shaft 29 which extends axially in the longitudinal passage 11 of the longitudinal member 9 and which comprises a radial upstream plate 30 and a radial downstream plate 31 which are spaced apart longitudinally and between which the inner portions of the longitudinal sluice blades 19 extend, the inner longitudinal edges 32 of the longitudinal sluice blades 19 being located opposite and remote from the rotating longitudinal shaft 29.

Figure 5:
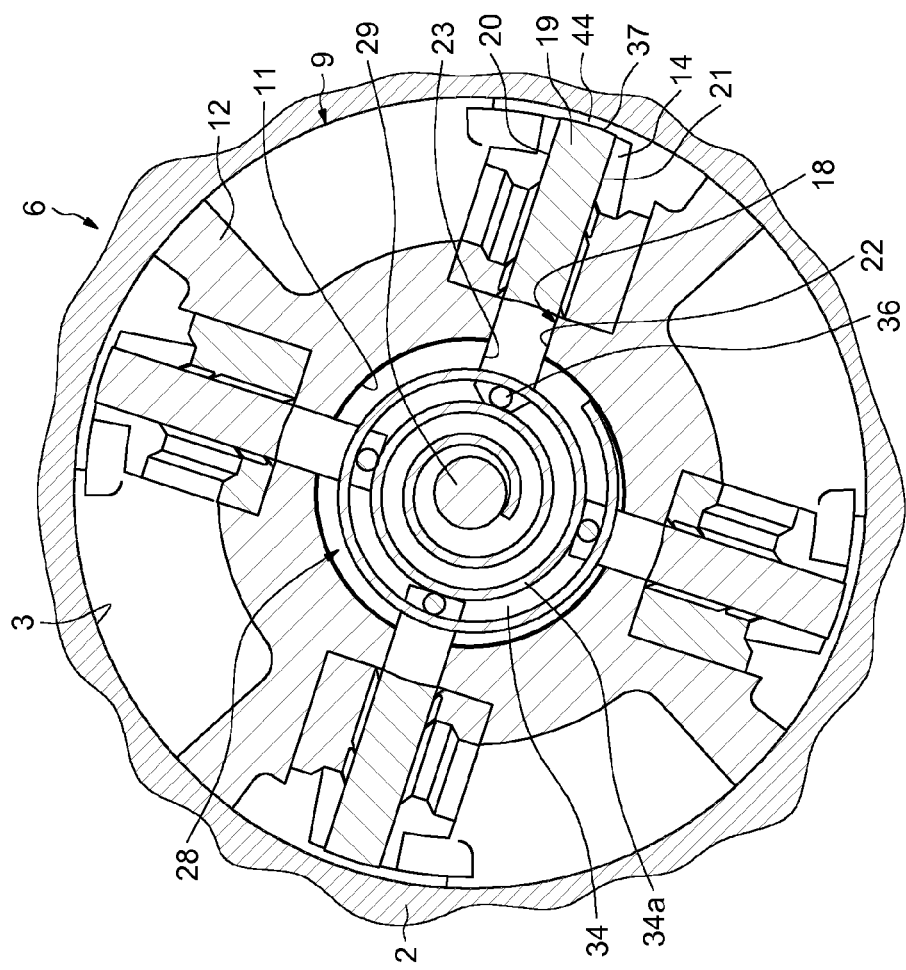
FIG. 5 is a radial cross-section along V-V of the extruder of FIG. 1.

The opposing radial faces of the radial plates 30 and 31 are provided with grooves 33 and 34 which extend in the form of helixes (FIG. 5) and which are formed facing each other. At the longitudinal ends thereof, the longitudinal sluice blades 19 are provided with longitudinal fingers 35 and 36 which are engaged in the helical grooves 33 and 34, respectively.

The longitudinal fingers 35 and 36 are radially offset, respectively, so that the outer longitudinal edges 37 of the longitudinal sluice blades 19 are located opposite and at the same distance from the wall of the portion 3*b* of the longitudinal channel 3 of the longitudinal sheath 2.

The angular position of the rotating longitudinal shaft 29 relative to the longitudinal member 9 determines the radial position of the longitudinal sluice blades 19.

The torpedo 6 comprises a downstream end piece 38 in the form of an ogive, for blocking the longitudinal channel 11, whose radial face is against the radial downstream face of the longitudinal member 9. The downstream end piece 38 is fixed to the longitudinal member 9, for example, by means of screws (not illustrated) and has a longitudinal through-channel 39.

The longitudinal shaft 29 is mounted in the following manner.

An upstream portion 29*a* of the longitudinal shaft 29, located upstream of the upstream plate 30, is rotatably mounted in a portion 40 of the longitudinal member 9, protruding inwards relative to the longitudinal channel 11.

A downstream portion 29*b* of the longitudinal shaft 29, located downstream of the downstream plate 31, is rotatably mounted in a portion 41 of the downstream end piece 38, protruding inwards relative to the longitudinal channel 39.

The shaft is retained longitudinally by the fact that an upstream radial face of the upstream plate 30 is adjacent to a radial downstream face of the portion 40 of the longitudinal member 9 and a downstream radial face of the downstream plate 31 is adjacent to an upstream radial face of the portion 41 of the downstream end piece 38.

The downstream end of the downstream portion 29*b* of the longitudinal shaft 29 is provided with a head 42, for example, with a square or hexagonal cross-section which is capable of axially receiving a tool for driving in rotation (not illustrated), for example, a simple wrench.

The downstream end portion 38 is provided with a stopper 43 for blocking the longitudinal channel 39, located downstream of the head 42 of the longitudinal shaft 29.

The torpedo 6 may be assembled in the following manner.

There are provided separately the longitudinal member 9, the sluice blades 19, the longitudinal shaft 29, the downstream end piece 38 and the stopper 43.

The longitudinal shaft 29 is engaged in an upstream direction in the longitudinal channel 11 of the longitudinal member 9 until the end 29*a* is engaged in the portion 40 and the upstream plate is in abutment with the portion 40 of the longitudinal member 9.

The downstream end piece 38 is mounted by engaging the downstream portion 29*b* of the longitudinal shaft 29 through the portion 41 of the downstream end piece 38.

The longitudinal sluice blades 19 are radially engaged from the outer side to the inner side in the corresponding longitudinal apertures 18.

Using a tool in engagement with the head 42, the longitudinal shaft 29 is rotated in order to engage the fingers 35 and 36 of the longitudinal sluice blades 19, successively in the outer inlets of the helical grooves 33 and 34 then to bring about the movement of the longitudinal sluice blades 19 from the outer side to the inner side, at least until the longitudinal sluice blades 19 are introduced between the upstream and downstream local portions 13 and 14 of the thread portions 12 of the longitudinal member 9.

The stopper 43 is mounted on the downstream end piece 38.

Then, the torpedo 6 and the screw 5 are coupled and the rotating assembly 4 is installed in the longitudinal channel 3 of the sheath 2 of the extruder 1.

The outer edges 12*a* of the thread portions and optionally the outer edges of the upstream and downstream local portions 13 and 14 are adjacent to the wall of the longitudinal channel 3 of the sheath 2.

Other portions of the extruder 1 are mounted, in particular a die downstream of the torpedo 6, so that the extruder 1 is operational.

The extruder 1 may function in the following manner.

The longitudinal sluice blades 19 are adjusted radially so that the distance between the outer longitudinal edges 37 of these sluice blades 19 and the wall of the downstream portion 3*b* of the longitudinal channel 3 of the sheath 2 establishes reduced flow spaces 44 (FIGS. 1 and 5) less than the spaces which are provided between the thread portions 12 and between the body 9 and the wall of the downstream portion 3*b* of the longitudinal channel 3 of the sheath 2.

During use of the extruder 1 provided with the rotating assembly 4, the material to be extruded is guided and flows between the thread portions 12, from the upstream flow space 15 and as far as the downstream flow space 16.

During this flow, the material to be extruded encounters the longitudinal sluice blades 19 and is forced to pass the longitudinal sluice blades 19 and to flow only through the reduced flow spaces 44. This flow brings about a working of the material to be extruded. The radial adjustment position of the longitudinal sluice blades 19 is determined by the working which it is desirable to apply to the material to be extruded.

During assembly of the torpedo 6, as described above, it is possible to have preadjusted the radial position of the longitudinal sluice blades 19 so that the reduced flow spaces 44 are adapted for the working which it is desirable to apply to the first material to be extruded.

If it is desirable to apply a different working to the material currently to be extruded or if it is desirable to use the extruder 1 to extrude a different material, on which it is desirable to apply a different working, it is possible to carry out a different adjustment of the longitudinal sluice blades 19 in the following manner.

A reduced portion of the extruder 1 which is located downstream is disassembled in order to have access at the front to the rotating assembly 4, which remains in place.

The stopper 43 is disassembled in order to have access to the downstream head 42 of the longitudinal shaft 29 in the longitudinal channel 39 of the end piece 38.

A tool is coupled to the downstream head 42 of the rotating longitudinal shaft 29.

The rotating longitudinal shaft 29 is rotated in one direction or the other.

In doing this, the helical ribs 33*a* and 34*a* which separate the helical grooves 33 and 34 of the plates 30 and 31 of the rotating longitudinal shaft 29 act on the fingers 35 and 36 of the longitudinal sluice blades 19 and bring about the radial movement from the inner side towards the outer side or from the outer side towards the inner side of the longitudinal sluice blades 19, thus bringing about a movement together or movement apart of the outer edges 37 of the longitudinal sluice blades 19 relative to the wall of the portion 3*b* of the longitudinal channel 3 of the sheath 2, which brings about a decrease or an increase of the cross-sections of the reduced flow spaces 44.

The new radial adjustment position of the longitudinal sluice blades 19 relative to the wall of the portion 3*b* of the longitudinal channel 3 of the sheath 2 is reached when the rotating longitudinal shaft 29 has reached a new angular position relative to the longitudinal member 9.

The new adjustment being complete, the stopper 43 is placed back onto the end piece 38 and the portions of the extruder 1 which were previously disassembled are repositioned.

As a result of their arrangements, the radial adjustment forces of the sluice blades 19 are reduced.

The extruder 1 can then be used with this new adjustment of the longitudinal sluice blades 19.

In order to prevent the material to be extruded from penetrating inside the torpedo 6, it is advantageous to provide means for ensuring sealing between the longitudinal sluice blades 19 and the longitudinal member 9.

According to an example illustrated in FIGS. 2 to 4, sealing means comprise longitudinal sealing joints 45 and 46 which are carried by the longitudinal member 9 and which move into abutment with the faces 20 and 21 of the longitudinal sluice blades 19, over the entire length thereof.

The sealing joints 45 and 46 may have deformable portions, such as lips, which are subjected to the pressure of the material to be extruded in the direction of their abutment against the opposing faces 20 and 21 of the longitudinal sluice blades 19.

The sealing joints 45 and 46 may be metal.

Figure 6:
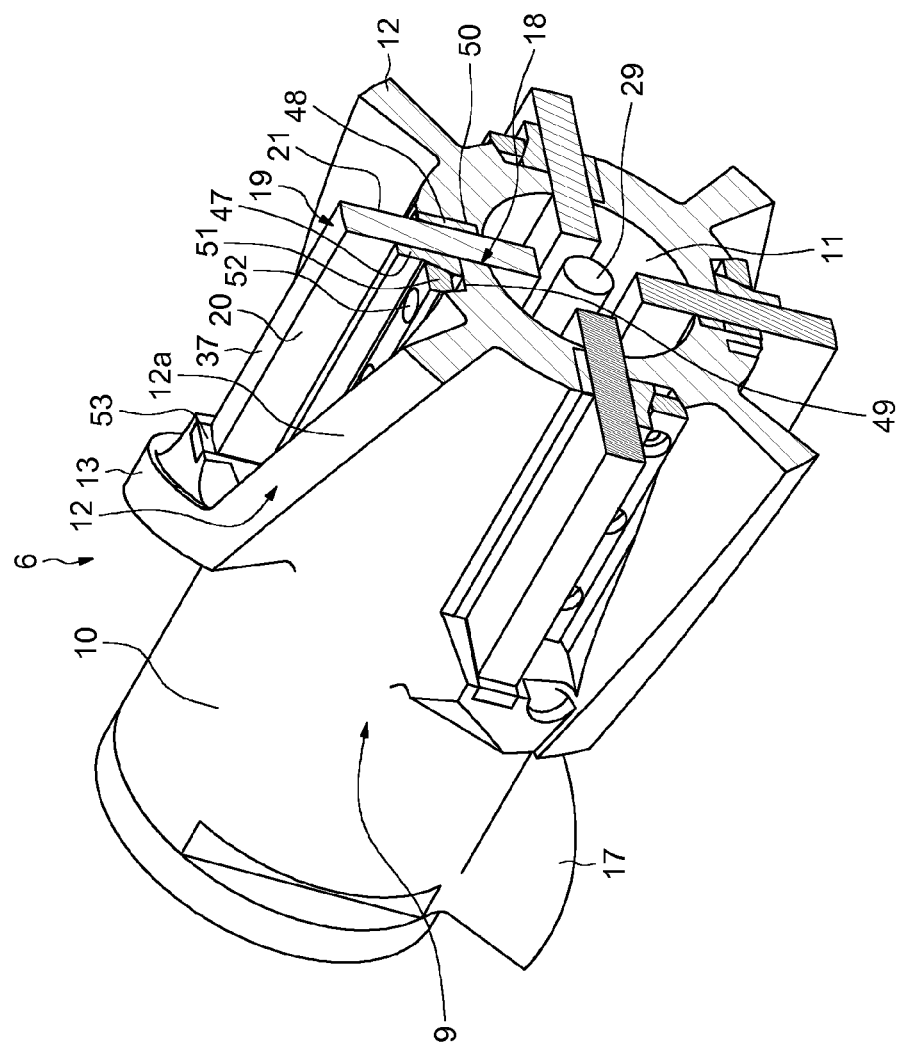
FIG. 6 is a perspective partial radial section of a construction variant of the torpedo of FIG. 2.

According to another example illustrated in FIG. 6, sealing means comprise longitudinal trim plates 47 and 48, for example of composite material, which are inserted in recesses 49 and 50 of the longitudinal member 9 and which are in abutment against the opposing faces 20 and 21 of the longitudinal sluice blades 19.

A longitudinal corner 51 may be inserted between the trim plate 47 and a wall of the recess 49, this longitudinal corner 51 being retained by adjustment screws 52 which enable the abutment pressures of the longitudinal trim plates 47 and 48 against the opposing faces 20 and 21 of the longitudinal sluice blades 19 to be adjusted.

Figure 7:
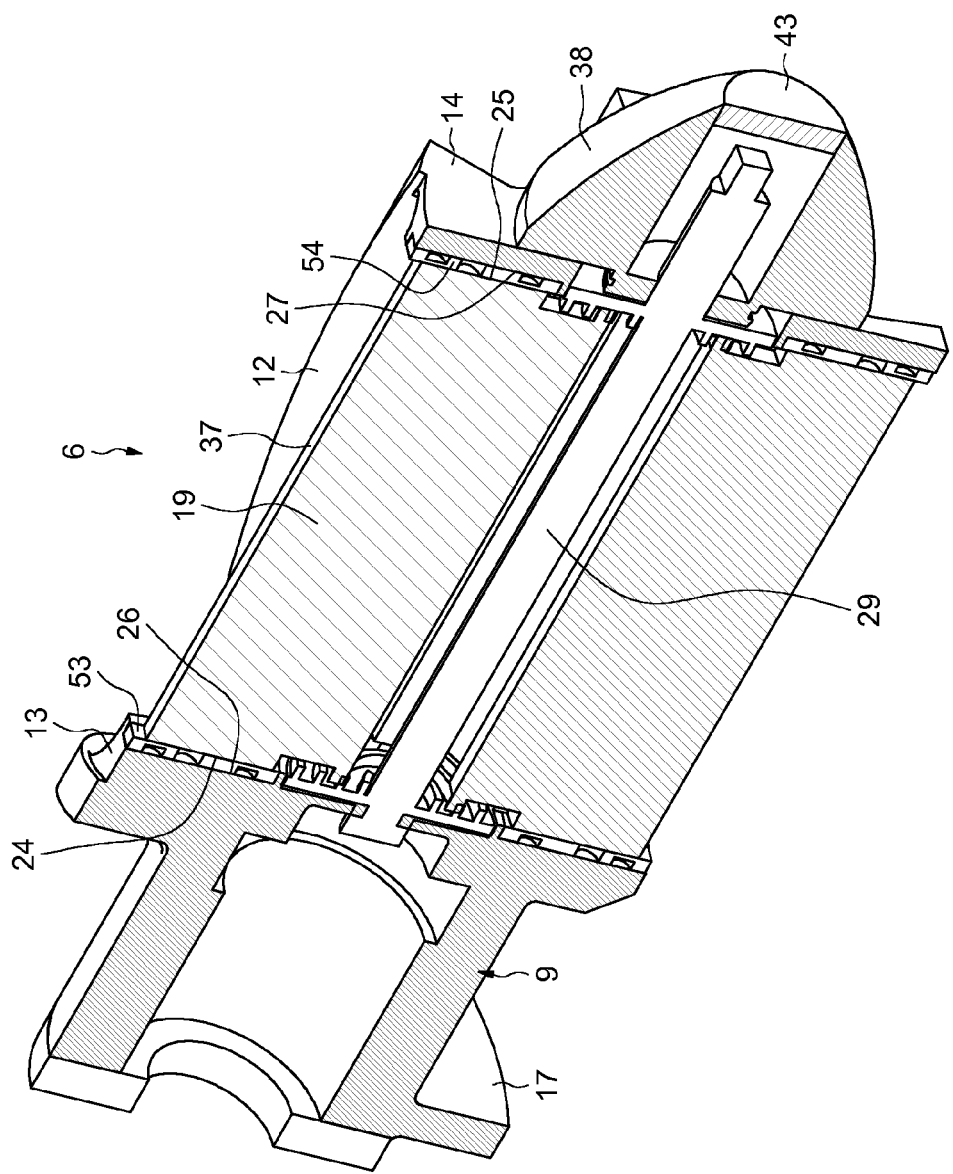
FIG. 7 is a perspective longitudinal section of the torpedo of FIG. 6.

According to another example illustrated in FIGS. 6 and 7, sealing means comprise radial trim plates 53 and 54, for example of composite material, which are inserted between the upstream and downstream radial ends of the longitudinal sluice blades 19 and the upstream and downstream local portions 13 and 14.

Figure 8:
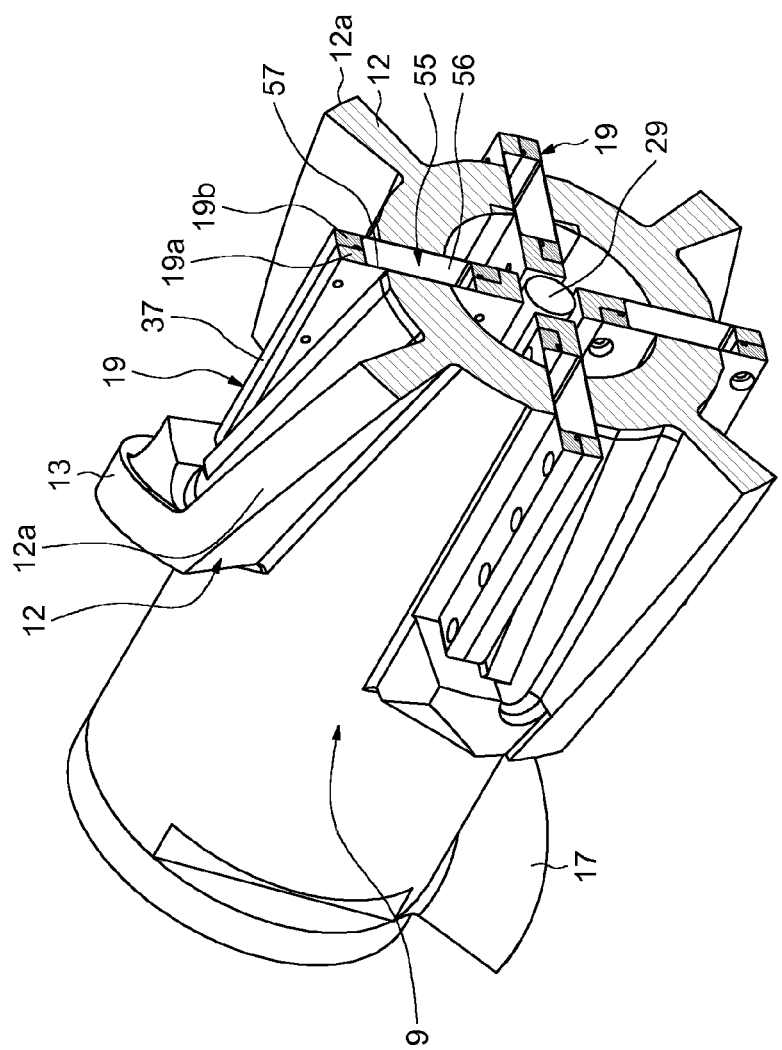
FIG. 8 is a perspective partial radial section of a construction variant of the torpedo of FIG. 2.

According to another example illustrated in FIG. 8, the longitudinal sluice blades 19 comprise two adhesively bonded portions 19*a* and 19*b* which provide between them a longitudinal chamber 55 which is delimited laterally by deformable longitudinal walls 56 and 57. The deformable longitudinal walls 56 and 57 are pressed against the opposing faces of the apertures 18 under the action of the pressure in the chambers 55, this pressing action ensuring the sealing.

The torpedo 6 has been described taking into consideration the fact that the sluice blades 19 extend longitudinally and that the thread portions 12 extend in a helical manner. Nonetheless, different arrangements could be adopted.

The ends 24 and 25 of the sluice blades 19 could be adjacent to local portions 13 and 14 which are located remote from the upstream and downstream ends of the thread portions 12.

The sluice blades 19 could extend in planes which are inclined relative to the longitudinal axis of the longitudinal member 9, the apertures 18 being produced as a result.

The sluice blades 19 could extend in radial planes. In this case in particular, the sluice blades 19 could be offset longitudinally. The outer edges 37 of the sluice blades 19 could, for example, be in the form of circular arcs, of the same diameter as the corresponding portions of the channel 3 of the sheath 2 in order to provide flow spaces 44 of constant thicknesses. The longitudinal adjustment shaft 29 could comprise pairs of grooved radial plates 30 and 31 which are coupled to the sluice blades 19, respectively.

The thread portions 12 could extend longitudinally.

The invention claimed is:

1. A torpedo for an extruder, the torpedo comprising:
    a longitudinal member which is provided at a periphery thereof with a plurality of thread portions which protrude outward and which are spaced apart in a circumferential direction;
    a plurality of sluice blades which are mounted so as to be movable on the longitudinal member and which are partially engaged in apertures of the longitudinal member, the longitudinal member and the sluice blades being provided with complementary radial guiding surfaces which are in contact with each other; and
    adjustment means for radially displacing the sluice blades relative to the longitudinal member,
    wherein the adjustment means comprise a longitudinal shaft which is rotatably mounted in a longitudinal channel of the longitudinal member, the longitudinal shaft and the sluice blades having complementary surfaces which cooperate in order to radially displace the sluice blades when the longitudinal shaft is displaced,
    wherein the longitudinal shaft comprises at least one radial plate, one radial face of which is provided with at least one helical groove, the sluice blades comprising a finger which is engaged in the at least one helical groove,
    wherein the sluice blades extend through spaces between the thread portions, respectively, and
    wherein the thread portions and the sluice blades are provided with complementary radial guiding surfaces which are in contact with each other.

2. The torpedo according to claim 1, wherein the thread portions comprise protruding portions between which the sluice blades extend.

3. The torpedo according to claim 1, wherein the longitudinal member is provided with an end piece for blocking the longitudinal channel.

4. The torpedo according to claim 3, wherein the end piece has a longitudinal access channel with respect to an end of the longitudinal shaft, the end piece being provided with a stopper for blocking the longitudinal access channel.

5. The torpedo according to claim 1, wherein the sluice blades are mounted on the longitudinal member in a sealing manner.

6. The torpedo according to claim 1 further comprising sealing means between the sluice blades and the longitudinal member.

7. The torpedo according to claim 1, wherein the sluice blades comprise deformable portions which are pressed in a sealing manner against surfaces of the longitudinal member.

8. The torpedo according to claim 1, wherein the sluice blades extend longitudinally and the thread portions extend in a helical manner.

9. An extruder comprising a sheath and a rotating longitudinal assembly, the sheath having a longitudinal channel, the rotating longitudinal assembly comprising a screw and the torpedo according to claim 1, the torpedo mounted at a downstream end of the screw, the thread portions of the torpedo having outer edges which are adjacent to a wall of the longitudinal channel of the sheath and reduced flow spaces being provided between outer edges of the sluice blades and the wall of the longitudinal channel of the sheath.

* * * * *